United States Patent
Aleksandrov et al.

[11] Patent Number: 5,966,479
[45] Date of Patent: Oct. 12, 1999

[54] OPTIMIZED BIREFRINGENT FIBER SWITCH

[75] Inventors: Igor Vladimirovitch Aleksandrov; Zinaida Vasylevna Nestrova, both of St. Petersburg, Russian Federation; Daniel Aloysius Nolan, Corning, N.Y.

[73] Assignee: Corning Incorporated, Corning, N.Y.

[21] Appl. No.: 08/983,083

[22] PCT Filed: Jul. 1, 1997

[86] PCT No.: PCT/US97/11698

§ 371 Date: Dec. 22, 1997

§ 102(e) Date: Dec. 22, 1997

[87] PCT Pub. No.: WO98/01780

PCT Pub. Date: Jan. 15, 1998

[30] Foreign Application Priority Data

Jul. 9, 1996 [RU] Russian Federation ............. 96115314

[51] Int. Cl.[6] ..................................................... G02B 6/26
[52] U.S. Cl. .............................. 385/16; 385/28; 385/122; 372/6
[58] Field of Search .................................. 385/16, 17, 18, 385/20, 21, 22, 23, 24, 28, 122, 123; 372/6

[56] References Cited

U.S. PATENT DOCUMENTS

| | | | |
|---|---|---|---|
| 3,918,794 | 11/1975 | Milton | 350/96 |
| 4,298,245 | 11/1981 | Aulich et al. | 350/96.29 |
| 4,756,589 | 7/1988 | Bricheno et al. | 350/96.15 |
| 4,805,977 | 2/1989 | Tamura et al. | 350/96.16 |
| 5,140,656 | 8/1992 | Hasegawa et al. | 385/24 |
| 5,185,749 | 2/1993 | Kalman et al. | 372/6 |
| 5,309,540 | 5/1994 | Turpin et al. | 385/123 |
| 5,455,710 | 10/1995 | Takeda | 359/341 |

OTHER PUBLICATIONS

International Search Report, International application No. PCT/US97/11698 dated Oct. 15, 1997.

*Primary Examiner*—Hung N. Ngo
*Attorney, Agent, or Firm*—William Greener

[57] ABSTRACT

An optical fiber switch in accordance with the present invention includes an optical fiber, a gate signal generating system, and a coupling system. The optical fiber has a birefringence between $10^{-5}$ and $10^{-6}$ and an effective area of at least 40 square microns. The generating system generates a gating signal having a power level which induces non-linear birefringence in the optical fiber causing an input signal in the optical fiber to switch polarization modes. The coupling system couples the input signal and the gating signal into the optical fiber. The optical fiber in the optical switch is designed to minimize non-linear effects which would degrade an input signal in the optical fiber switch. In particular, the optical fiber switch is designed to reduce the amount of power required by the gating signal to switch the input signal in the optical fiber, thus reducing the possibility of the fiber fuse and the generation of higher order solitons through Raman effects.

7 Claims, 1 Drawing Sheet

OPTIMIZED BIREFRINGENT FIBER SWITCH

FIELD OF THE INVENTION

This invention relates generally to an optical fiber switch and, more particularly, to a birefringent optical fiber switch with a large effective area and a minimum linear birefringence.

BACKGROUND OF THE INVENTION

An optical fiber switch includes an optical fiber with a birefringence which can maintain an input signal in one of two perpendicular polarization paths and a laser pump coupled to the optical fiber and which can generate a gating signal. The optical fiber switch operates by having an input signal propagate in one of the two perpendicular polarization modes in the optical fiber until a gating signal is input into the optical fiber in the same polarization mode as the input signal is propagating in. If the gating signal has sufficient power, the gating signal induces non-linear birefringence in the optical fiber causing the input signal to switch orientation and propagate in the other polarization mode. To maintain polarization, the optical fiber in the optical fiber switch described above is selected to be strongly birefringent, i.e. $10^{-4}$ or greater, and if the optical fiber is strongly birefringent, then the optical fiber has a small effective area, i.e. less than 40 microns$^2$.

The main problem with the optical fiber switch described above is that an input signal in the optical fiber switch experiences an undesirable amount of non-linear effects which degrade the input signal. The nonlinear effects include fiber fuse, which is discussed in "Experimental Investigation of the Fiber Fuse," by D. D. Davis & S. C. Mettler, in Optical Fiber Conference, WP17, pp. 186–187, 1995, which is herein incorporated by reference, the creation of higher order solitons due to Raman effects, and cross-phase modulation which is explained in greater detail below. The non-linear effects occur because of the high birefringence of the optical fiber, the small effective area of the optical fiber, and the high power level required for the gating signal. In particular, the input signal experiences an undesirable amount of nonlinear effects because of the high power level required for the gating signal to switch the input signal. The high power level for gating signal is needed because of the high birefringence of the optical fiber.

As discussed above, one of the non-linear effects experienced by the input signal and which increases as the power level of the gating signal increases is cross-phase modulation. The amount of cross-phase modulation experienced by the input signal can be estimated by the following equation:

$$\Delta\phi = (2\pi/\lambda)*[L*N_2*I]$$

where L is the length of the optical fiber, $N_2$ is the index of refraction of the core, and I is the power level or intensity of the gating signal in watts. As can be seen from this equation, the amount of cross-phase modulation experienced by the input signal increases as the power level or intensity of the gating signal increases. Accordingly, reducing the power level of the gating signal will reduce the amount of cross-phase modulation.

SUMMARY OF THE INVENTION

An optical fiber switch in accordance with the present invention includes an optical fiber, a gate signal generating system, and a coupling system. The optical fiber has a birefringence between $10^{-5}$ and $10^{-6}$ and an effective area of at least 40 square microns. The generating system generates a gating signal having a first power level which induces non-linear birefringence in the optical fiber causing an input signal in the optical fiber to switch polarization modes. The coupling system couples the input signal and the gating signal into the optical fiber.

The optical fiber in the optical fiber switch is designed to minimize non-linear effects which would degrade an input signal in the optical fiber switch. In particular, the optical fiber switch is able to reduce nonlinear effects, such as fiber fuse, the creation of higher order solitons, and cross-phase modulation, by using an optical fiber which has the minimum birefringence needed to maintain polarization and to ensure low polarization mode coupling and which has a larger effective area and requires a lower power level for the gating signal to switch the input signal in the optical fiber than prior optical fiber switches described earlier.

DETAILED DESCRIPTION OF THE INVENTION

Figure 1:
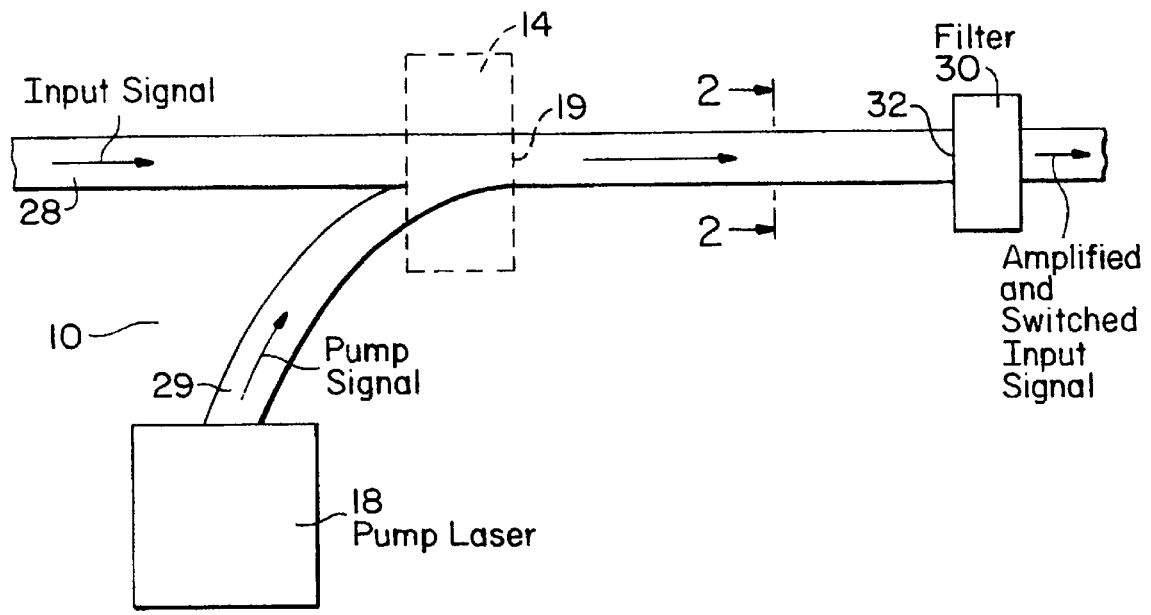
FIG. 1 is a block diagram of an optimized birefringent fiber switch in accordance with the present invention.

An optical fiber switch 10 in accordance with the present invention is illustrated in FIG. 1 and includes an optical fiber 12 with a birefringence of between $10^{-5}$ and $10^{-6}$ and an effective area of at least 40 square microns, a coupler 14, and a laser pump 18. Optical fiber 12 in optical fiber switch 10 is designed to minimize non-linear effects which would degrade an input signal in optical fiber switch 10. In particular, optical fiber switch 10 is designed to reduce the power level required by the gating signal to be able to induce non-linear birefringence and switch the input signal in optical fiber 12. The combination of a gating signal with a lower power level and an optical fiber 12 with a minimum birefringence and a larger effective area reduces the amount of undesired nonlinear effects on input signals in optical fiber switch 10.

Referring more specifically to FIG. 1, fiber optic switch 10 includes optical fiber 12 which is designed to have a birefringence sufficient enough to maintain polarization in first and second polarization modes in optical fiber 12, yet which is small enough to minimize non-linear effects which degrade input signals in optical fiber switch 10. Preferably, the birefringence of optical fiber 12 is designed to be in the range of $10^{-5}$ and $10^{-6}$ which is the minimum range which is sufficient to maintain polarization and to ensure low polarization mode coupling. Optical fiber 12 does not need to be as strongly birefringent as prior optical fibers discussed earlier to be able to maintain polarization.

Since optical fiber 12 is also likely to be twisted and bent during use, the minimum range of birefringence of optical fiber 12, preferably $10^{-5}$ to $10^{-6}$, must be sufficient to prevent coupling between polarization modes in optical fiber 12 during bending and twisting of optical fiber 12. As explained below, a birefringence in the range of $10^{-5}$ to $10^{-6}$ for optical fiber 12 is sufficient to prevent coupling between polarization modes in optical fiber 12 due to bending and twisting.

Induced birefringence in an optical fiber due to bending is discussed in "Rotational Effects of Polarization in Optical Fibers in Anisotropic and Nonlinear Optical Waveguides" by R. Dandliker, Elseview Press, 1992, which is herein incorporated by reference. As discussed in Dandliker, the induced birefringence η in optical fiber 12 due to bending can be determined from the following equation:

$$\eta = 2\pi/\lambda[0.0685 r^2/R^2] = (2\pi/\lambda)\Delta n_{bend}$$

where λ is the wavelength of the input signal, r is the radius of the fiber, and R is the radius of the bend. Accordingly, if the range of birefringence of optical fiber 12 is known and the radius r of optical fiber is known, the radius R optical fiber 12 can be bent without resulting in coupling between polarization modes can be determined.

By way of example for optical fiber 12, even if $\Delta n_{bend} = 10^{-7}$, then $R^2 = (0.0685 \times 10^7) (r^2)$. If 2r=0.0625 mm, then using the equation above R=5 cm and the diameter of bend is 10 cm. Accordingly, as shown in this example, optical fiber 12 can be bent to wrap around coil with a 10 cm diameter, which is acceptable for packaging, without causing coupling between polarization modes to occur.

Twisting of optical fiber 12 can also cause problems and effects the minimum birefringence which could be used. The amount of power coupled from one polarization mode to another in an optical fiber due to twisting of the optical fiber is discussed in "Rotational Effects of Polarization in Optical Fiber in Anisotropic and Nonlinear Optical Waveguides" by R. Dandliker, Elseview Press, 1992, which is herein incorporated by reference. As discussed in Dandliker, the amount of power in the two polarization modes in an optical fiber can be determined using the following matrix:

$$\begin{bmatrix} P_1 \\ P_2 \end{bmatrix} = \begin{bmatrix} \cos\gamma d + i\frac{\eta}{\gamma}\sin\gamma d & -\frac{\sigma}{\gamma}\sin\gamma d \\ \frac{\sigma}{\gamma}\sin\gamma d & \cos\gamma d - \frac{i\eta}{\gamma}\sin\gamma d \end{bmatrix} \begin{bmatrix} 1 \\ 0 \end{bmatrix}$$

In this analysis, n is the inherent birefringence of optical fiber 12, σ is the twist induced birefringence, λ is the total birefringence, d is the length of optical fiber, and i is:

$$\sqrt{-1}.$$

The twist induced birefringence a is also given by $$\sigma = 0.16T/2$$

where T is the twist rate in radians/meter. The total birefringence is:

$$\gamma = \sqrt{\sigma^2 + \eta^2}.$$

The power coupled in dB is:

$$P_{dB} = 10 \log_{10} [\sigma/\lambda(\sin \lambda d)/(\cos \lambda d + i(\eta/\lambda) \sin \lambda d)]$$

By way of example, calculating for T with a twist rate of 0.628 radians/meter in a 10 meter length optical fiber 12 with an inherent birefringence of $\Delta n = 10^{-6}$, a cross coupling of −20 db is obtained, which is sufficiently low. Accordingly, a minimum birefringence range of $10^{-5}$ to $10^{-6}$ is acceptable.

Optical fiber 12 also has a larger effective area than prior optical fibers in optical fiber switches. Preferably, the effective area for optical fiber 12 is 40 square microns or greater. As is well known to those skilled in the art, increasing the effective area of optical fiber 12 helps to reduce non-linear effects on any input signal in optical fiber 12.

Figure 2:
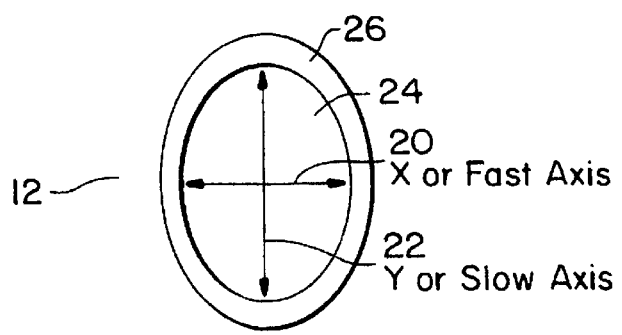
FIG. 2 is a cross-sectional view of the optical fiber in the optimized birefringent fiber switch taken along line 2—2 in FIG. 1.

Referring to FIG. 2, optical fiber 12 has an elliptical, cross sectional shape with a short or fast axis 20 and a long or slow axis 22. The elliptical cross-sectional shape of optical fiber 12 induces optical fiber 12 to have a birefringence and the particular elliptical cross-sectional shape of optical fiber 12 determines the amount of birefringence. The ratio of the second length to the first length is about 2:1. Preferably, the ratio of the length of long axis 22 with respect to short axis 20 is about 1.5 to 1 to obtain a birefringence in the range of $10^{-5}$ and $10^{-6}$. If the cross-sectional shape of optical fiber 12 is too elliptical, i.e. long axis 22 is much longer than short axis 20, then the gating signal will need a high amount of power to switch the input signal. If the cross-sectional shape of optical fiber 12 is too round, i.e. the length of long axis 22 and short axis 20 are about the same, then optical fiber 12 will not be able to maintain polarization and thus can not be used in an optical fiber switch 10. Although an optical fiber 12 with an elliptical cross-sectional shape achieves the desired birefringence, other types of optical fibers, such as an optical fiber with stress rods whose birefringence was within the desired range could be used.

Referring to FIG. 1, fiber optic switch 10 also includes laser pump 18, coupler 14, and a filter 24. Laser pump 18 generates the gating signal which induces non-linear birefringence in optical fiber 12 causing the input signal to switch between polarization modes. The gating signal output by laser pump 18 can have a range of power levels. Since optical fiber 12 has a lower birefringence than prior optical fibers, a lower power level can be used for the gating signal. Although this particular embodiment uses a pump laser 18, any type of system which generates the gating signal with the desired level of power can be used. Coupler 14 couples any input signals and any gating signals input into optical fiber 12. Coupler 14 is located between an optical fiber 26 and one end 28 of optical fiber 12. In a preferred embodiment, coupler 14 is a wavelength division multiplexer (WDM) coupler. Although a single coupler 14 is shown, separate couplers could be used to input the input signal and gate signal. Filter 24 is coupled to the other end 32 of optical fiber 12 and removes unwanted wavelengths after the input signal has been switched, including any of the gating signal which remains.

Fiber optic switch 10 operates when an input signal is coupled into optical fiber 12 via coupler 14 to propagate in one of the polarization modes. The birefringence of optical fiber 12 is in the range of $10^{-5}$ and $10^{-6}$, which is sufficient to maintain polarization and ensures low polarization mode coupling. When a gating signal is input into optical fiber 12 via second coupler 16 in the same polarization mode as the input signal, the gating signal will induce non-linear birefringence in optical fiber 12 causing the input signal to switch and propagate in the other polarization mode, if the power level of the gating signal is sufficient.

As discussed earlier, the power level needed for the gating signal to induce non-linear birefringence in optical fiber 12 and cause the input signal to switch polarization modes depends upon the birefringence of optical fiber 12. The birefringence of optical fiber 12 can be determined by the following equation, as discussed in M. N. Islam, *Ultrafast Fiber Switching Devices and Systems*, Cambridge University Press, 1992, which is herein incorporated by reference:

$$\Delta N = 0.33 N_2 (I_x - I_y)$$

where ΔN is the nonlinear birefringence, $N_2$ is the nonlinear index of refraction of the core of optical fiber 12, $I_x$ is the intensity of the input signal along the x-axis, and $I_y$ is the intensity of the input signal along the y-axis. Assume for purposes of this discussion that the polarization mode extends along the x-axis and the y-axis and that $I_y$ where $I_x$ can be further defined as:

$$I_x = P_x/A_x$$

where $P_x$ is the power level of the gating signal input and $A_x$ is the effective area of optical fiber 12. Substituting the above equation into the equation for calculating the birefringence of optical fiber 12 results in the equation:

$$\Delta N = 0.33 N_2 P_x/A_x$$

Solving the above equation for $P_x$ results in the following equation:

$$P_x = (\Delta N * A_x)/0.33 N_2$$

Accordingly, if the birefringence of optical fiber 12 is designed to be lower, i.e. in a range between $10^{-5}$ and $10^{-6}$ than for prior optical fibers in optical fiber switches as described earlier, then as can be seen by this equation the power, $P_x$, of the gating signal will also be lower. Preferably, the power of the gating signal ranges between 0.1 and 10 kilowatts. As discussed earlier, the amount of cross-phase modulation of an input signal in optical fiber 12 depends upon the power of the gating signal. Reducing the amount of power required for the gating signal reduces the amount of cross-phase modulation.

As can be seen by the equation for calculating the birefringence of optical fiber 12, reducing the birefringence of optical fiber 12 also permits the effective area to be enlarged. Solving the equation for calculating the birefringence of optical fiber 12 for effective area $A_x$ results in the following equation:

$$A_x = (0.33 N_2 P_x)\Delta N$$

Accordingly, if the birefringence of optical fiber 12 is designed to be lower, as described above to be in a range between $10^{-5}$ and $10^{-6}$, then as can be seen by this equation the effective area of optical fiber 12 will be larger. Preferably, effective area of optical fiber 12 is 40 microns$^2$ or greater. As is well known to those skilled in the art, increasing the effective area of optical fiber 12 will reduce the undesirable non-linear effects on an input signal. Thus, optical fiber switch 10 is able to reduce non-linear effects, in particular fiber fuse and the generation of higher order solitons through Raman effect by reducing the birefringence, increasing effective area, and reducing the power required for the gating signal.

Having just described the basic concept of the action, it will be readily apparent to those skilled in the art that the forgoing detailed disclosure is intended to be presented by way of example only, and is not limiting. Various alterations, improvements, and modification will occur and are intended to those skilled in the art, though not expressly stated herein. These modifications, alterations, and improvements are intended to be suggested hereby, and are within the spirit scope of the invention. Accordingly, the invention is limited only by the following claims and equivalents thereto.

What is claimed is:

1. An optical fiber switch comprising:

an optical fiber having a birefringence between $10^{-5}$ and $10^{-6}$ for polarizing an input signal in one of two polarization modes and an effective area of at least 40 square microns;

a gate signal generating system, the generating system generating a gating signal having a first power level which induces non-linear birefringence in the optical fiber causing the input signal in the optical fiber to switch to the other polarization mode; and a coupling system for coupling the input signal and the gating signal into the optical fiber.

2. The optical fiber switch set forth in claim 1 wherein the gate signal generating system is a pump laser.

3. The optical fiber switch set forth in claim 1 wherein the coupling system further comprises a WDM coupler.

4. The optical fiber switch set forth in claim 1 further comprising a filter coupled to one end of the optical fiber, the filter removing any unwanted wavelengths.

5. The optical fiber switch set forth in claim 1 wherein the optical fiber has an elliptical cross-sectional shape with a short axis of a first length and a long axis of a second length.

6. The optical fiber switch set forth in claim 5 wherein the ratio of the second length to the first length is about 2.0 to 1.

7. The optical fiber switch set forth in claim 5 wherein the ratio of the second length to the first length is about 1.5 to 1.

* * * * *